3,120,506
PRODUCTION OF OLEFIN POLYMERS
Donald E. Carr, Bartlesville, Okla., assignor to Phillips Petroleum Company, a corporation of Delaware
No Drawing. Filed Sept. 7, 1960, Ser. No. 54,348
6 Claims. (Cl. 260—93.7)

This invention relates to the production of olefin polymers. In one aspect, the invention relates to an improved method for preparing olefinic polymers having a high isotactic content. In another aspect, this invention relates to the preparation of polymers of alpha-olefins in the presence of an acetylenic alcohol or ether. In another aspect, the invention relates to a polymerized alpha-olefin having a high isotactic content prepared by polymerization in the presence of an acetylenic alcohol or ether. In another aspect, the invention relates to an improved process for polymerizing alpha-olefins by conducting the polymerization reaction in contact with a catalyst comprising a component selected from the group consisting of organometal compounds, metal hydrides and metals of groups I, II and III of the periodic system and a component comprising a compound of a metal of groups IV, V, VI or VIII in the presence of an acetylenic alcohol or ether and to a polymer having a high isotactic content prepared by this process. In another aspect, this invention relates to an improved process for polymerizing alpha-olefins by conducting the polymerization reaction in contact with a catalyst comprising a trialkylaluminum and a titanium halide in the presence of an acetylenic alcohol or ether and to the improved polymer prepared by this process.

The polymerization of olefins to solid polymers is well known and various catalyst systems have been developed for use in such operations. One catalyst system which has been frequently used in olefinic polymerizations consists of an organometal compound, such as triethylaluminum, along with a compound of a heavy metal, such as titanium trichloride or tetrachloride. It has been observed that polymers of certain olefins, prepared in the presence of such catalysts, contain greater or lesser amounts of a fraction which is characterized by a certain regularity of molecular structure. For example, a polypropylene molecule may be considered as a chain of two-carbon units with a methyl side group attached to every other carbon atom in the chain. Certain propylene polymers of this type are characterized by the fact that they contain a series of such monomer units in which the methyl side groups are oriented in space at the same position or at the same angle with respect to the carbon atoms to which they are attached. This portion of the polymer is referred to as isotactic polypropylene, and, similarly, in other olefin polymers, the portion having the regularity of structure is highly crystalline and is termed broadly "isotactic polymer." The amount of isotactic polymer product formed in a given polymerization appears to have a significant influence on such properties of the polymer product as hardness, modulus, ultimate tensile strength, melting point range, and molding and fiber-forming properties. The higher the isotactic content, the more outstanding are the physical properties of the polymer.

It is an object of my invention to provide an improved process for producing polymers. Another object of my invention is to produce polymers having improved properties as compared with conventionally prepared polymers.

Other aspects, objects and the several advantages of this invention will be apparent from a study of this disclosure and the appended claims.

I have discovered that an olefin polymer having a high isotactic content can be produced by conducting the polymerization reaction in the presence of an acetylenic alcohol or an acetylenic ether. According to my invention, an olefin polymer is prepared by contacting the olefin with a polymerization catalyst in the presence of an acetylenic alcohol or an acetylenic ether. Also, according to my invention, such a process is provided in which one component of the polymerization catalyst is an organometal and the olefin is an alpha-olefin. Further, according to my invention, I provide a polymerization process which comprises contacting an olefin having the formula R—CH=CH$_2$ in which R is selected from the group consisting of an alkyl group containing 1 to 4 carbon atoms, a phenyl group and an alkyl substituted phenyl group with a polymerization catalyst under polymerization conditions in the presence of an acetylenic alcohol or an acetylenic ether. In one embodiment of my invention, the polymerization catalyst comprises a plural component system comprising a component selected from the group consisting of organometal compounds, metal hydrides and metals of groups I, II and III of the periodic system and a component comprising a compound of a metal of groups IV, V, VI and VIII, and, in a preferred embodiment of my invention, the catalyst comprises a trialkylaluminum and titanium trichloride. Also, according to my invention, I have provided a polymerized olefin having a high content of isotactic polymers, the polymer being prepared by contacting an olefin having the formula R—CH=CH$_2$ in which R is selected from the group consisting of an alkyl group containing 1 to 4 carbon atoms, a phenyl group and an alkyl substituted phenyl group, with a plural component polymerization catalyst as described above. According to my invention, the acetylenic alcohol or acetylenic ether is used in a very small amount, generally in the range between 0.01 and 0.5 mol, preferably between 0.01 and 0.3 mol, per mol of total catalyst composition.

The acetylenic alcohols used in the process of the invention are compounds having the general formula R(OH)$_x$ in which R is a straight or branched open chain alkynyl or alkynylene group containing from three to ten carbon atoms and $x$ is 1 or 2. Examples of such compounds include 2-propyn-1-ol (propargyl alcohol), 2-butyn-1-ol, 3-methyl-1-butyn-3-ol, 2,5,5-trimethyl-3-hexyn-2-ol (2-tert-butyl-ethynyl dimethyl carbinol), 3-decyn-1-ol, 2-butyn-1,4-diol, 6-methyl-3-octyn-1-ol, 1-butyn-4-ol, 3-decyn-1,6-diol, and the like.

The acetylenic ethers are compounds of the general formula R'—O—R'' in which R' and R'' are open chain straight or branched chain hydrocarbon groups which may be the same or different and at least one of which is an alkynyl group radical containing from three to six carbon atoms, the sum of the carbon atoms in R' and R'' being from four to twelve. Typical of these acetylenic ethers are di-2-propynyl ether (dipropargyl ether), di-2-butynyl ether, di-3-methyl-4-pentynyl ether, n-butyl 2-butynyl ether, methyl 2-propynyl ether, n-hexyl 3-hexynyl ether, and the like.

The process of the present invention is applicable for the polymerization of olefins of the general formula R—CH=CH$_2$ in which R is an alkyl group containing 1 to 4 carbon atoms or a phenyl or alkyl substituted phenyl group. Examples of such olefins are propylene, 1-butene, 1-pentene, 3-methyl-1-butene, 3-methyl-1-pentene, 4-methyl-1-pentene, 3,3-dimethyl-1-butene, styrene, 2-methylstyrene, and the like.

The polymerization reaction is conducted in the presence of a two or more component catalyst system wherein one component is an organometal compound, including those wherein one or more but not all the organic groups are replaced by hydrogen or halogen; a metal hydride; or a metal of groups I, II or III of the periodic system and the second component is a group IV to VI or VIII metal compound.

The preferred catalyst for use in the practice of this invention comprises a trialkylaluminum and a halide of titanium. The trialkylaluminum can be represented by the general formula R′$_3$Al, wherein R′ is an alkyl radical, preferably containing from 1 to 12, inclusive, carbon atoms.

In addition to the trialkylaluminum, the catalyst used in the practice of this invention includes a halide of titanium. While any of the titanium halides can be used, including the chlorides, fluorides, bromides, and iodides, it is preferred to employ the tri- and tetrachlorides of titanium. It has also been found to be particularly desirable to use titanium trichloride as a component of the catalyst system.

Although as noted above certain aluminum compounds are preferred, the organometal compounds referred to include alkyl, cycloalkyl, or aryl compounds of mono-, di-, tri-, or tetravalent metals, particularly

| | |
|---|---|
| Aluminum | Cesium |
| Gallium | Magnesium |
| Indium | Cadmium |
| Beryllium | Mercury |
| Sodium | Zinc |
| Potassium | Barium |
| Lithium | Lead |
| Rubidium | Tin | or such organometal compounds where one or more, but not all, of the alkyl, cycloalkyl or aryl groups is replaced by a hydrogen atom and/or halogen atom. The organo groups can be quite large, compounds being applicable which have 15 or more carbon atoms in each alkyl, cycloalkyl or aryl group, and 40 or more carbon atoms in the molecule. Specific examples of such organometal compounds include Trimethylaluminum
Triethylaluminum
Triisobutylaluminum
Tri-n-butylaluminum
Tri-n-pentylaluminum
Triisooctylaluminum
Tri-n-dodecylaluminum
A mixture of diethylaluminum chloride and ethylaluminum dichloride, sometimes referred to as ethylaluminum sesquichloride
Diethylaluminum hydride
Ethylaluminum dichloride or diethylaluminum chloride, taken alone,
Trioctylaluminum
Tridodecylaluminum
Triphenylaluminum
Triphenylgallium
Diphenylberyllium
Dicyclohexylberyllium
Cyclohexylzinc fluoride
Tetraphenyllead
Tetraethyltin
Methylaluminum dichloride
Dimethylaluminum chloride
Dibutylaluminum bromide
Octylaluminum diiodide
Dipropylgallium fluoride
Dicyclohexylgallium chloride
Phenylgallium dibromide
Eicosylgallium dibromide
Ditetradecylgallium fluoride
Diphenylindium chloride
Octylindium difluoride
Cyclohexylindium dibromide
Heptadecylberyllium iodide
Methylberyllium bromide and the like.

Specific examples of preferred catalyst systems which can be advantageously used include the following:

Triethylaluminum and titanium trichloride
Triisobutylaluminum and titanium trichloride
Tri-n-dodecylaluminum and titanium trichloride
Titanium tribromide and tri-n-butylaluminum
Titanium tribromide and triisooctylaluminum
Titanium triiodide and tri-n-pentylaluminum
Titanium triiodide and tri-n-hexylaluminum
Titanium tetrachloride and triisobutylaluminum
Titanium tetrabromide and tri-n-heptylaluminum
Titanium tetraiodide and triethylaluminum.

The compounds of groups IV to VI and VIII include the salts and alcoholates. Typical of these and presently preferred are the compounds of titanium and particularly titanium trichloride.

The metal hydrides can include, as specific examples,

Aluminum hydride
Lithium aluminum hydride
Barium hydride
Gallium hydride
Indium hydride
Sodium aluminum hydride
Potassium beryllium hydride The metals of the first, second and third groups are applicable as a class, the most important members being sodium, magnesium and aluminum.

The compounds of a metal of groups IV to VI or VIII of the periodic system include the Oxides
Hydrides
Halides
Oxyhalides and salts of organic acids, usually having 20 or less carbon atoms, such as formic acid, of the groups IV to VI or VIII metals, such as

| | |
|---|---|
| Titanium | Molybdenum |
| Zirconium | Vanadium |
| Chromium | Iridium |
| Thorium | |

A third catalyst component which can be advantageously used is an organic halide or metal halide where the organic radical has 30 or less carbon atoms, and is an alkyl, cycloalkyl or aryl group. Specific examples are Ethyl bromide
Ethyl trichloro titanium
1-bromobenzene
Cyclohexyl chloride Also applicable are the alkali metal or ammonium halide, an aluminum halide (where the catalyst also includes another metal compound, such as a titanium compound), a halogen, a hydrogen halide, a complex hydride, a mixture of an organic halide and a metal, and a Grignard reagent.

The ratio of the catalyst components used can be varied over a fairly broad range depending on the monomer used and the operating conditions. Generally, the range of the organometal or metal hydride to the heavy metal compound is in the range between 1:1 and 10:1, preferably between 2:1 and 5:1. The concentration of catalyst in the polymerization zone is usually in the range between 0.01 and 5.0 weight percent based on monomer charged, although larger amounts can be used, if desired.

The quantity of acetylenic alcohol or ether used is very small and, since in the polymerization this compound appears to operate as an adjuvant or modifier for the catalyst, the amount used is based on the amount of catalyst present, generally being in the range between 0.01 and 0.5 mol, preferably between 0.01 and 0.3 mol, per mol of total catalyst composition.

Usually, the polymerization is effected in the presence of a hydrocarbon diluent which is relatively inert and liquid under the conditions maintained and which does not have a deleterious effect on the catalyst. The hydrocarbon diluents used may be paraffinic, cycloparaffinic, or aromatic, typified by

| Butane | Methylcyclohexane |
| Pentane | Benzene |
| Hexane | Toluene |
| Cyclohexane | Xylene | and the like. The amount of diluent employed can vary over a fairly broad range depending on the particular conditions and techniques employed and the capacity of the apparatus used to effect suitable agitation and heat removal. In general, the total olefin content of the feed material charged to the polymerization zone is in the range between 0.5 and 25 weight percent based on the diluent used. In some instances, the polymerization is conducted using the liquefied olefin monomer as the diluent. In others, the operation is conducted vapor phase in the complete absence of diluent.

Polymerization temperatures will be in the range between about 50 and 500° F., preferably between 200 and 300° F. Pressures will be sufficient to maintain the reactor contents substantially in the liquid phase, generally being in the range between about atmospheric and about 500 p.s.i.g., although pressures outside this range can be used.

The process of the invention involves charging the olefin to be polymerized to a reactor containing the catalyst, the catalyst adjuvant, and the diluent. Generally, it is preferred to charge a portion of the diluent initially after which the system is purged with an inert gas, such as nitrogen. The catalyst components are then charged separately to the reactor with intermediate purging and the group I, II and III metal, metal hydride, or organometal charged in at least a portion of the remaining diluent, the remainder being then added as a rinse following the catalyst charge. The monomer is then introduced and the reactor heated until polymerization is initiated. Generally, the acetylenic alcohol or ether is charged to the reaction with the initial diluent although it may be introduced at any time during the charging procedure. For a particular monomer and a given catalyst, reaction time is generally a function of the temperature employed and may vary, for example, in the range between about 15 minutes and 24 hours.

Recovery of the polymer is effected after cooling the reactor and venting any unreacted olefin. The catalyst is then inactivated by any suitable means, such as by washing with alcohol or water, conveniently in a comminution zone, such as a Waring Blendor. The polymer is then separated and dried.

EXAMPLE

A series of runs was made in which, in each instance, 1,000 ml. cyclohexane were charged to a stainless steel reactor together with a weighed amount of a selected acetylenic alcohol adjuvant material, the reactor being purged with nitrogen prior to and during the charging procedure. A weighed amount of titanium trichloride was then added after which the reactor was closed. The reactor was then flushed twice with nitrogen, after which a weighed amount of triethylaluminum in 500 ml. cyclohexane was introduced through a charging tube, followed by 500 ml. cyclohexane as a rinse. The system was then flushed twice with propylene at 100 p.s.i.g. The stirrer was started and 0.6 pound of propylene charged. The temperature was elevated to 200° F. and maintained in a range between 200 and 260° F. Additional propylene was added in the later stages of the reaction when necessary to maintain the average pressure at about 150 p.s.i.g. At the end of 2.5 hours, the propylene feed, if used, was shut off, the stirrer stopped, and the reactor cooled.

The reactor contents were discharged into about an equal volume of methanol and comminuted in a Waring Blendor for about 1 minute. The polymer was removed on a filter and again washed in methanol in the Blendor, after which it was recovered and dried under vacuum at 80–85° C. overnight.

Heptane insolubles content was determined by placing 2.5±0.1 grams of polymer in a weighed extraction thimble and extracting with 100 ml. of n-heptane in an A.S.T.M. rubber extraction apparatus. The thimble was then removed and dried at 110° C. for two hours after which it was cooled in a desiccator and weighed. The weight percent of residue based on the original polymer was calculated and recorded as isotactic content.

The adjuvants used and data on the polymerization runs are shown below.

Table

| Alkynol[a] | TEA | | TiCl₃ | | Alkynol | | Mol. Ratio, TEA/TiCl₃/Adj. | Mol. Ratio, Cat./Adj. | Temp., °F. | | Propylene, lbs. | Yield, gms. | Prod. gm./gm. Cat. | Heptane Insol., Percent |
|---|---|---|---|---|---|---|---|---|---|---|---|---|---|---|
| | gm. | mm. | gm. | mm. | gm. | mm. | | | Min. | Max. | | | | |
| A | 1.42 | 12.4 | 0.644 | 4.18 | 0.059 | 0.895 | 3/1/0.214 | 1/0.0540 | 200 | 250 | 1.31 | 74 | 36 | 85.1 |
| A | 1.44 | 12.6 | 0.657 | 4.26 | 0.119 | 1.80 | 3/1/0.423 | 1/0.107 | 200 | 240 | 0.60 | 42 | 20 | 88.0 |
| B | 1.39 | 12.2 | 0.630 | 4.09 | 0.143 | 1.02 | 3/1/0.25 | 1/0.0627 | 200 | 258 | 1.00 | 279 | 139 | 84.8 |
| C | 1.44 | 12.6 | 0.647 | 4.20 | 0.180 | 2.09 | 3/1/0.50 | 1/0.124 | 200 | 250 | 1.20 | 346 | 161 | 85.5 |
| | 1.52 | 13.3 | 0.689 | 4.47 | | | 3/1/0 | | 200 | 250 | 1.47 | 531 | 240 | 80.0 |

[a] A = 2-propyn-1-ol; B = 2-t-butylethynyl dimethyl carbinol; C = 2-butyn-1,4-diol.

Referring to the data in the table, it will be seen that, carrying out the polymerization in the manner of this invention, using the adjuvants taught herein, polymers having isotactic contents of about 85 percent and higher were produced while, using the same catalyst components in the same ratio, but without the adjuvant, resulted in an isotactic content of 80 percent. The polymers produced in accordance with this invention have utility in applications where solid plastics are used. They can be molded to form articles of any desired shape, such as bottles or other containers for liquids and they can be formed into sheets, film or pipe by extrusion or other suitable methods.

Reasonable variation and modification are possible within the scope of the foregoing disclosure and the appended claims to the invention, the essence of which is a process for producing a high isotactic content olefin polymer by conducting the polymerization reaction in the presence of a catalyst, preferably a catalyst comprising a trialkylaluminum and a halide of titanium, and an acetylenic alcohol or an acetylenic ether and an improved olefin polymer produced by this reaction.

I claim:
1. A polymerization process comprising contacting an olefin having the formula R—CH=CH$_2$ in which R is selected from the group consisting of an alkyl group containing 1 to 4 carbon atoms, a phenyl group and an alkyl substituted phenyl group with a polymerization catalyst comprising the product formed by the admixture of a trialkyl aluminum and a trihalide of titanium under polymerization conditions in the presence of between 0.01 and 0.5 mol per mol of total catalyst composition of an acetylenic alcohol having the general formula R(OH)$_x$ in which R is a group selected from the group consisting of straight open chain alkynyl, branched open chain alkynyl, straight open chain alkynylene, and branched open chain alkynylene containing from 3 to 10 carbon atoms and $x$ is 1 or 2.

2. A polymerization process comprising contacting a propylene with a catalyst comprising the product formed by admixture of triethyaluminum and titanium trichloride under polymerization conditions in the presence of between 0.01 and 0.3 mol per mol of total catalyst composition of 2-propyn-1-ol.

3. A polymerization process comprising contacting a propylene with a catalyst comprising the product formed by admixture of triethylaluminum and titanium trichloride under polymerization conditions in the presence of between 0.01 and 0.3 mol per mol of total catalyst composition of 2-butyn-1-ol.

4. A polymerization process comprising contacting a propylene with a catalyst comprising the product formed by admixture of triethylaluminum and titanium trichloride under polymerization conditions in the presence of between 0.01 and 0.3 mol per mol of total catalyst composition of 3-methyl-1-butyn-3-ol.

5. A polymerization process comprising contacting a propylene with a catalyst comprising the product formed by admixture of triethylaluminum and titanium trichloride under polymerization conditions in the presence of between 0.01 and 0.3 mol per mol of total catalyst composition of 2-tert-butylethynyl dimethyl carbinol.

6. A polymerization process comprising contacting a propylene with a catalyst comprising the product formed by admixture of triethylaluminum and titanium trichloride under polymerization conditions in the presence of between 0.01 and 0.3 mol per mol of total catalyst composition of 2-butyne-1,4-diol.

References Cited in the file of this patent

UNITED STATES PATENTS

| | | |
|---|---|---|
| 2,905,645 | Anderson et al. | Sept. 22, 1959 |
| 2,965,626 | Pilar et al. | Dec. 20, 1960 |
| 3,022,283 | Wicklatz et al. | Feb. 20, 1962 |

FOREIGN PATENTS

| | | |
|---|---|---|
| 538,782 | Belgium | Dec. 6, 1955 |